(12) United States Patent
Nevin

(10) Patent No.: US 8,017,891 B2
(45) Date of Patent: Sep. 13, 2011

(54) INTERNAL HEATER FOR THERMOFORM PLASTIC SHEET

(76) Inventor: Donald Nevin, Woodbury, NY (US)

( * ) Notice: Subject to any disclaimer, the term of this patent is extended or adjusted under 35 U.S.C. 154(b) by 1123 days.

(21) Appl. No.: 11/318,202

(22) Filed: Dec. 23, 2005

(65) Prior Publication Data
US 2007/0145039 A1 Jun. 28, 2007

(51) Int. Cl.
H05B 3/16 (2006.01)
H05B 3/34 (2006.01)
B29C 39/00 (2006.01)

(52) U.S. Cl. ............... 219/543; 219/549; 264/46.8
(58) Field of Classification Search .......... 219/543, 219/549, 545, 542, 538; 338/307; 264/46.8; 174/250, 253, 255
See application file for complete search history.

(56) References Cited

U.S. PATENT DOCUMENTS

| | | | |
|---|---|---|---|
| 4,021,640 A * | 5/1977 | Gross et al. ............... | 219/211 |
| 4,079,232 A | 3/1978 | Brokoff et al. | |
| 4,676,938 A * | 6/1987 | Karklin et al. ............... | 264/46.5 |
| 5,569,474 A | 10/1996 | Kitaichi et al. | |
| 5,705,793 A | 1/1998 | Kitaichi et al. | |
| 5,743,989 A | 4/1998 | Kumangai et al. | |
| 6,072,158 A | 6/2000 | McNally | |
| 6,137,086 A * | 10/2000 | Williams, Jr. ............... | 219/203 |
| 6,276,532 B1 | 8/2001 | Sperry et al. | |
| 6,569,283 B1 | 5/2003 | Sperry et al. | |
| 7,223,941 B2 * | 5/2007 | Walker et al. ............... | 219/213 |
| 2001/0006173 A1 * | 7/2001 | Rock et al. ............... | 219/545 |
| 2004/0065659 A1 * | 4/2004 | Tse ............... | 219/529 |
| 2004/0155029 A1 * | 8/2004 | Haag ............... | 219/543 |
| 2004/0175164 A1 * | 9/2004 | Loktev et al. ............... | 392/436 |
| 2004/0226939 A1 * | 11/2004 | Winter et al. ............... | 219/549 |
| 2004/0240029 A1 * | 12/2004 | Tonazzi et al. ............... | 359/265 |

* cited by examiner

Primary Examiner — Daniel Robinson
(74) Attorney, Agent, or Firm — Epstein Drangel LLP; Robert L. Epstein

(57) ABSTRACT

A plastic material sheet for use in vacuum thermoforming is formed of polymer material. Electrically conductive resistance elements, at least a portion of which are situated within sheet, conduct electrical current to heat the sheet. The elements are generally parallel to each other. They may be straight, have a generally zigzag configuration, a generally serpentine configuration, an arcuate configuration, or a grid-like configuration. The elements may each have a section that extends substantially beyond the edge of the sheet. They may be frangible. They may be embedded deeply within the sheet or may be situated proximate a surface of the sheet.

20 Claims, 11 Drawing Sheets

To Current Source

To Current Source

INTERNAL HEATER FOR THERMOFORM PLASTIC SHEET

CROSS-REFERENCE TO RELATED APPLICATIONS

Not applicable

STATEMENT REGARDING FEDERALLY SPONSORED RESEARCH OR DEVELOPMENT

Not Applicable

REFERENCE TO A "SEQUENCE LISTING", A TABLE, OR A COMPUTER PROGRAM LISTING APPENDIX SUBMITTED ON COMPACT DISC

Not Applicable

BACKGROUND OF THE INVENTION

1. Field of the Invention

This invention relates to the thermoforming of articles from plastic material, and specifically in the use and construction of thermally deformable thermoform plastic material sheets used in vacuum molding, and more specifically in the use and construction of thermoform plastic material sheets for use in vacuum molding which are heated by wires internal to the thermoform plastic material sheet.

2. Description of Prior Art

Thermoforming, sometimes referred to as "vacuum molding", is the process that molds thermoform plastic material sheets into the desired shape through the pressing of "formers" (positive molds) into the previously heated plastic. The process of thermoforming is used in many industries, including the dental industry to form various articles including dental trays, base plates, fluoride trays, prostheses, splints, mouth guards, night guards and custom impression trays.

Thermoforming involves having a positive mold of an article supported between a vacuum-equipped surface, which is sometimes a special table, and a substantially flat, planar thermoform plastic material sheet, made of a plastic material with the desired properties. One such plastic material is EASTMAN Polyester 12822, available from Eastman Chemical of Kingsport, Tenn.

Heat from an external heat source such as a hot air blower, heat lamp or other radiant heat source is directed at the thermoform plastic material sheet. The thermoform plastic material sheet is heated to the point of softening. A vacuum is then applied to and below the table and around the mold thereon, and the now-softened thermoform plastic material sheet is rapidly and suddenly drawn toward the table, thus placing the softened plastic material in contact with the mold surface. The vacuum draws the softened plastic into tight contact with, and conformance to, the contours of the mold surface. Thus, the plastic assumes the shape of the mold. This prior art process is illustrated in FIG. 1A. After the plastic cools, it hardens to a solid, and the resulting article may be removed from the mold, as illustrated in FIG. 1B.

Proper heating of the plastic material is essential to the thermoforming process. Various techniques in the prior art have used a number of devices and methods to accomplish this heating. Typically heat is applied externally by convection, where very hot air is forced against the plastic, or by radiation, where infra-red lamps and/or hot radiating plates are used to heat the plastic, and perhaps sometimes by conduction.

Indeed, it is believed that all prior art devices and methods utilize a heat source that is external to the thermoformed plastic material sheet. However, the use of an external heat source has a number of disadvantages, such as the loss of heat to the environment, inefficiency in transferring heat to the material heated, etc.

An example of external delivery of heat to the thermoform plastic sheet is found in U.S. Pat. No. 6,072,158, which discloses, inter alia, quartz heaters above the thermoform plastic sheet heating it by radiation and hot air blowers below the thermoform plastic sheet heating it by convection.

OBJECTS OF THE INVENTION

It is an object of the present invention to provide an improved method of, and material for, thermoforming plastic material.

It is another object of the present invention to provide an improved method of, and material for, thermoforming plastic which eliminates the need for external heaters.

It is still another object of the present invention to provide an improved method of, and material for, thermoforming plastic material sheets which eliminates the need for, and heat loss associated with, external heaters by embedding the heating means inside the thermoform plastic material.

It is still another object of the present invention to provide an improved method of, and material for, thermoforming plastic material which utilizes internal thermoform plastic heater means in the form of electrically conductive elements such as resistance heating wires.

It is still another object of the present invention to provide an improved method of, and material for, thermoforming plastic material which eliminates the need for heaters outside the thermoform plastic by utilizing internal resistance heating wires, which wires may remain in the final thermoformed object, thereby providing improved material properties.

In one embodiment, it is an object of the present invention to provide an improved method of, and material for, thermoforming plastic material in which the internal wires are situated adjacent the surface of the sheet to permit removal thereof from the sheet in the thermoforming process.

It is still another object of the present invention to provide an inexpensive lightweight, portable, easily stored apparatus to accomplish the foregoing and other objects.

BRIEF SUMMARY OF THE INVENTION

In general, the above objects are achieved in the present invention by utilizing internal electrically conductive elements embedded in the plastic material sheet to supply the heat during the thermoforming process.

In the presently preferred method, heat is delivered internally to the thermoform plastic material sheet by electrically conductive elements in the form of electrical resistance wires which are embedded, wholly or partially, in the thermoform plastic sheet.

In accordance with the present invention, a plastic material sheet for use in vacuum thermoforming is provided. The sheet is formed of polymer material suitable for thermoforming. Electrically conductive means, at least a portion of which is situated within sheet, is adapted to conduct an electrical current so as to heat the sheet.

Preferably, the conductive means includes a plurality of spaced electrically conductive elements. The elements are generally parallel.

The elements may be generally straight, may have a generally zigzag configuration, a generally serpentine configuration, an arcuate configuration, or a grid-like configuration.

The elements may each have a section that extends substantially beyond the edge of the sheet.

The elements may be frangible.

The elements may be embedded deeply within the sheet or may be situated proximate a surface of the sheet.

In accordance with another aspect of the present invention, method is provided for thermoforming a sheet of polymer material having at least one at least partially embedded electrically conductive element with first and second exposed ends in an apparatus having a mold with a surface associated with vacuum means and a voltage source. The method comprises the steps of: connecting the exposed ends of the conductive element to the opposite poles of the voltage source; causing current to flow through the conductive element so as to heat the sheet, actuating the vacuum means to draw the heated sheet against the mold surface until the sheet assume the shape of the mold surface; terminating the current flow through the conductive element; and allowing the molded sheet to cool and removing the sheet from the mold.

The method also includes the step of removing the conductive element from the sheet, before the sheet is completely cooled.

In accordance with another aspect of the present invention, a thermoformed article is provided including an electrically conductive means at least partially embedded therein.

Preferably, the conductive means comprises a plurality of spaced, electrically conductive elements. The elements may be generally parallel to each other. At least some of the elements may be generally straight. At least some of the elements may include a section that extends substantially beyond the edge of the sheet. At least some of the elements may be frangible. The elements may have a generally grid-like configuration.

BRIEF DESCRIPTION OF THE SEVERAL VIEWS OF THE DRAWING

To these and to such other objects that may hereinafter appear, the present invention relates to a plastic sheet material for use in thermoforming, a method of using electrically conductive elements embedded with a plastic sheet material for thermoforming of articles, and to the articles themselves, as set forth in detail in the following specification, and recited in the annexed claims, taken together with the accompanying drawings, wherein like numerals refer to like parts, and in which:

FIG. 1A showing the thermoform sheet as it is heated prior to the application of vacuum and FIG. 1B showing the sheet material after completion of the process;

FIG. 2A showing the thermoform sheet material as it is heated, prior to the application of the vacuum and FIG. 2B showing the sheet after completion of the process;

DETAILED DESCRIPTION OF THE PRESENTLY PREFERRED EMBODIMENTS

As noted above, FIGS. 1A and 1B illustrate the thermoforming process of the prior art in which external heater means are used to heat the plastic material sheet. In the conventional process, thermoform plastic sheet material 10 has no electrically conductive heating elements embedded within it, or in direct physical contact with it, and is heated by an external heat source, such as an external heat lamp 12.

Figure 1A:
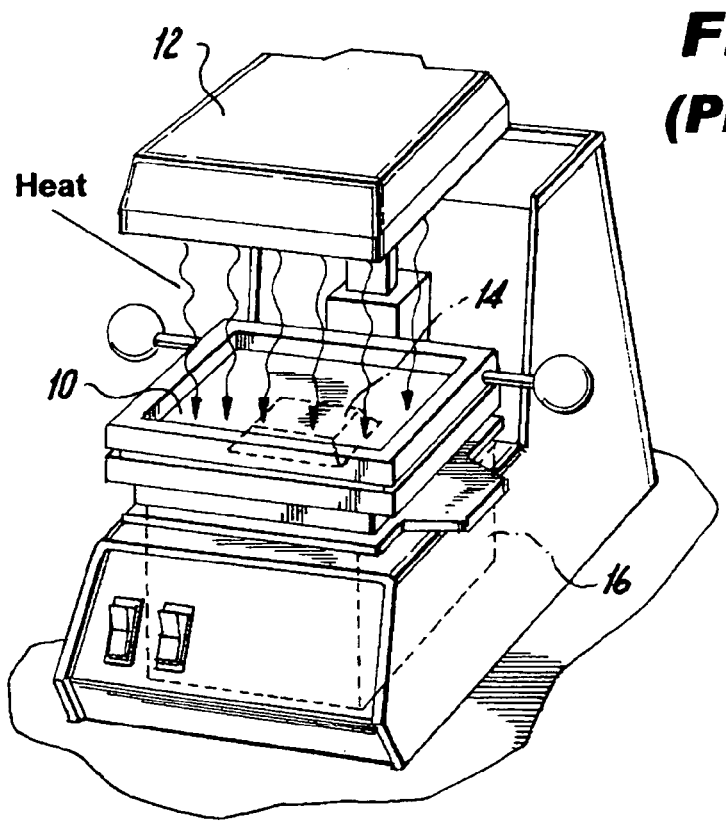
FIGS. 1A and 1B illustrate a conventional thermoforming apparatus and method utilizing externally heated thermoform plastic sheet material according to the prior art.

FIG. 1A shows thermoform plastic material sheet 10 as it is being heated and softened by heat source 12 and before the sheet is drawn downward onto mold 14 by vacuum means 16, acting through openings in base 18 surrounding the mold.

Figure 1B:
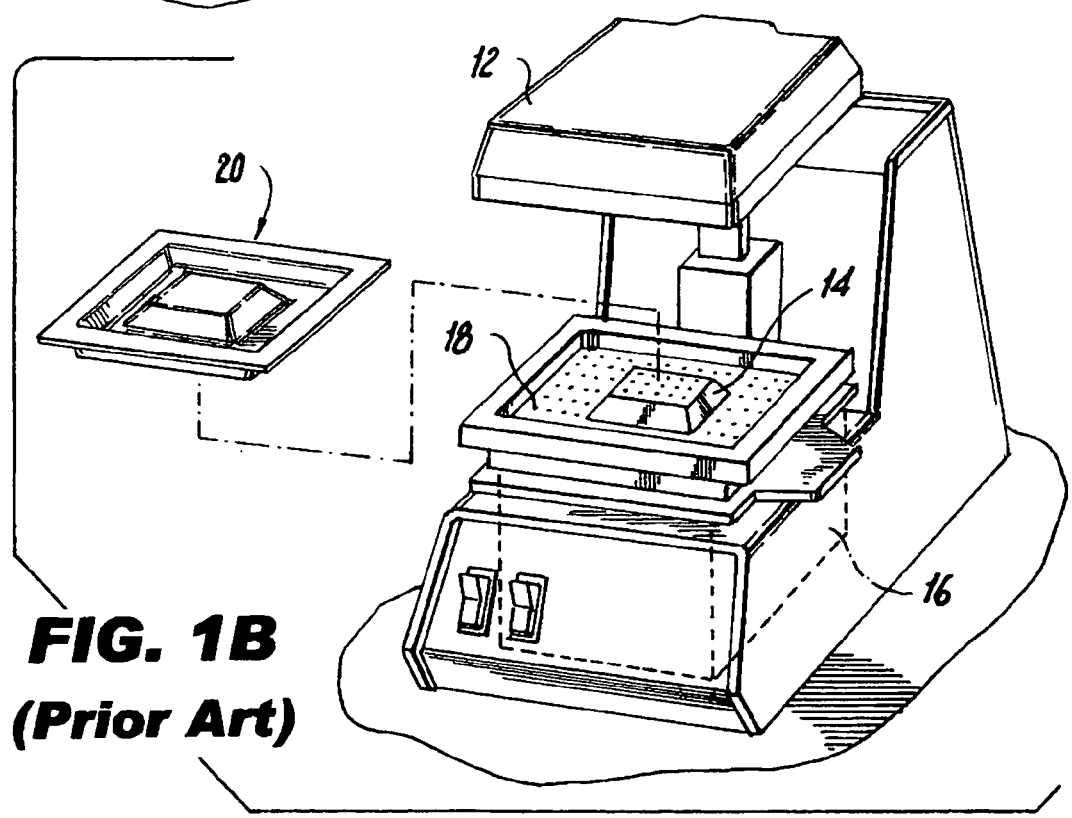

FIG. 1B is similar to FIG. 1A but shows the apparatus after the heated and softened thermoform plastic material sheet 10 has been drawn downward onto mold 14 by the vacuum supplied by vacuum means 16, and has been transformed into finished article 20, shown after being lifted from the mold. After the process is complete, article 20 has essentially the same shape as the mold surface.

Figure 2A:
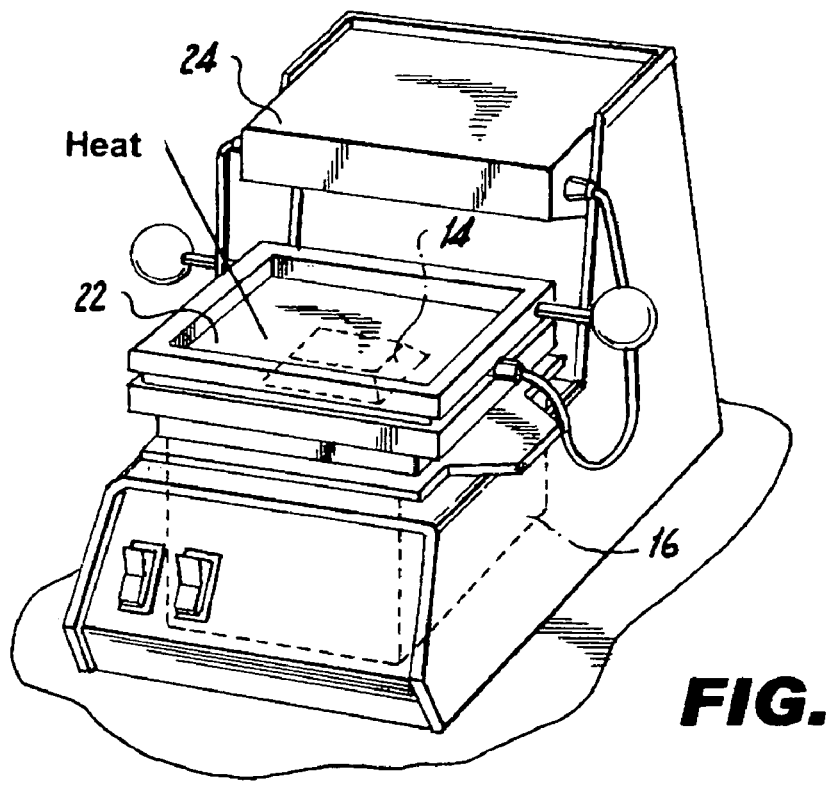
FIGS. 2A and 2B illustrate the thermoforming method and internally heated thermoform plastic sheet utilized therein according to the present invention.

FIG. 2A shows the thermoforming method of the present invention that utilizes a thermoform plastic material sheet 22 according to the present invention. Sheet 22, while similar in chemical composition to the conventional thermoform plastic material sheet 10 shown in FIGS. 1A and 1B, differs from sheet 10 in that it includes a plurality of spaced electrically conductive heating elements (not visible in this drawing) extending across the sheet and embedded therein. These elements preferably take the form of resistance wires, as described in detail below. A voltage source is provided in compartment 24 of the apparatus to impress a voltage across each of the conductive elements, so as to cause a current to flow and electrical resistance heating to occur. The electrically conductive elements are preferably connected in electrical parallel with each other between the opposite poles of the voltage source in compartment 24. The voltage source may be any power source, such as a transformer or a battery.

Figure 2B:
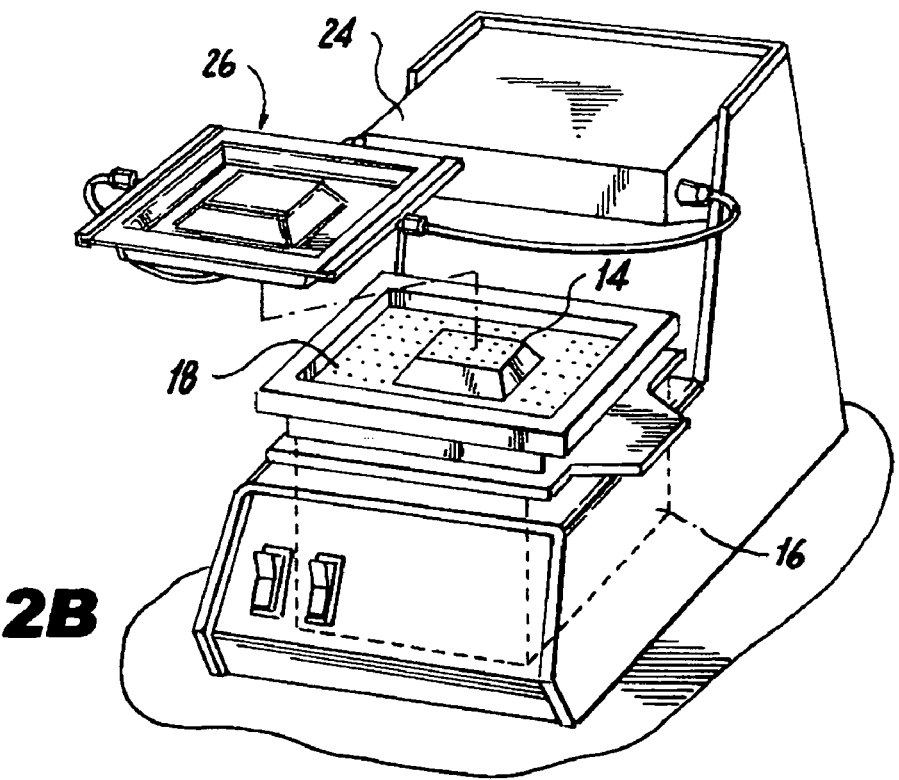
Figure 11:
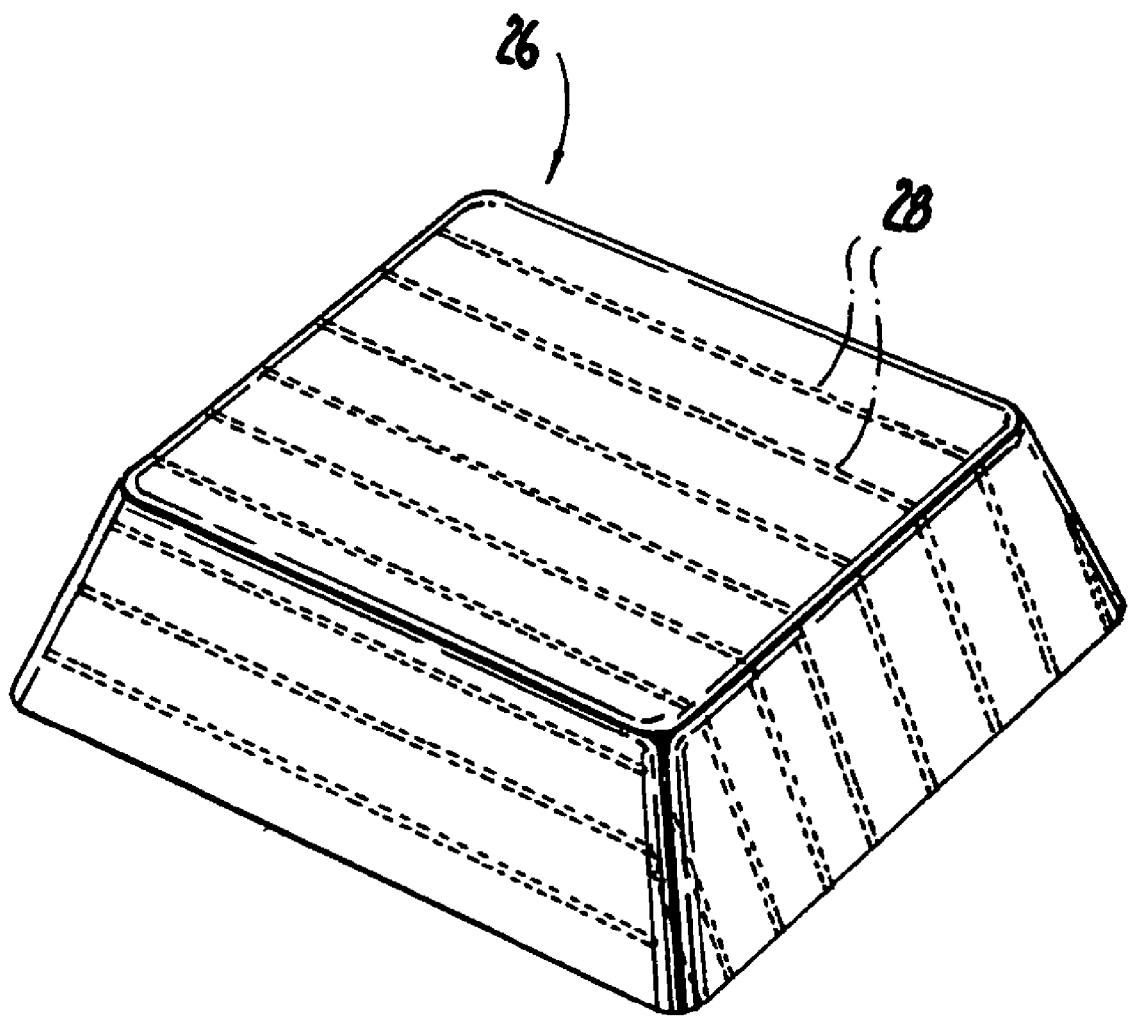
FIG. 11 is an isometric view of a molded clear plate with embedded wires fabricated according to the method of the present invention.

FIG. 2B illustrates the plastic material sheet, now in the form of a molded article 26, at the end of the process. Like article 20 of the prior art process, article 26 has the shape of the surface of mold 14. However, unlike article 20, article 26 has a plurality of resistance wires 28 embedded therein, as illustrated in the article shown in FIG. 11.

The topology of the circuit, e.g. whether wired in series, parallel, or some combination, as well as the values of the wire resistance, strength of voltage source is selected as to allow the desired resistance heating, as is well-known to those of ordinary skill in the relevant arts. Since the conductive elements are internal to thermoform plastic material sheet, the heat from the conductive elements will be transferred directly to the plastic sheet. When enough heat has been transferred, thermoform plastic material of the sheet will begin to soften. When the sheet has softened to the desired degree, the vacuum means 16 is actuated and the softened sheet is brought downward so that it is suddenly and rapidly physically drawn toward and over the mold, and is tightly held against the surface of the mold by the action of the vacuum means, thereby being stretched over the mold surface and assuming the shape of the mold surface, all in accordance with the principles of thermoforming.

Unlike with thermoform plastic sheet and methods of the prior art, however, the thermoforming sheet and method according to the present invention result in not merely a mold-shaped pure plastic article, but a mold-shaped wire-reinforced plastic article 26.

Figure 3A:
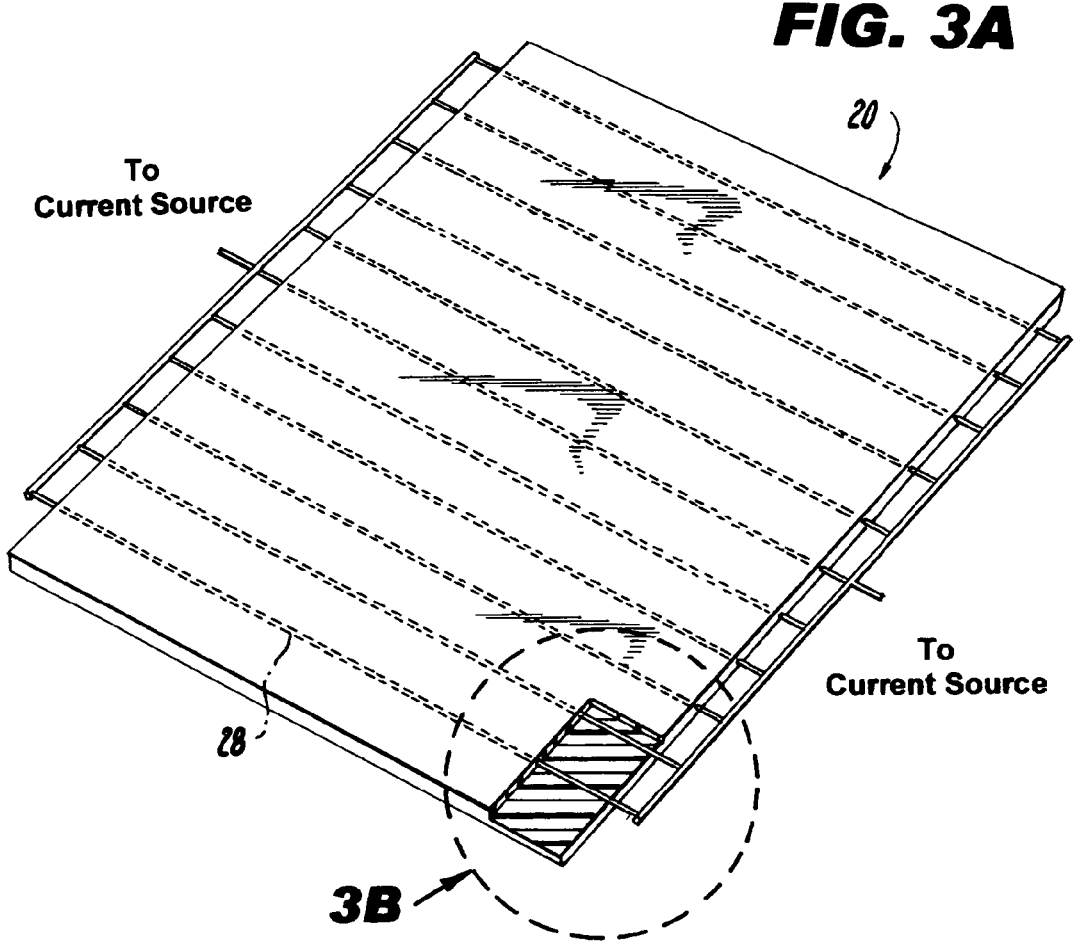
FIGS. 3A and 3B are respectively an isometric view and an enlarged, partially cut-away isometric view of a section of a first preferred embodiment of thermoform plastic material sheet having spaced, parallel straight embedded heating wires, in accordance with the present invention.
Figure 3B:
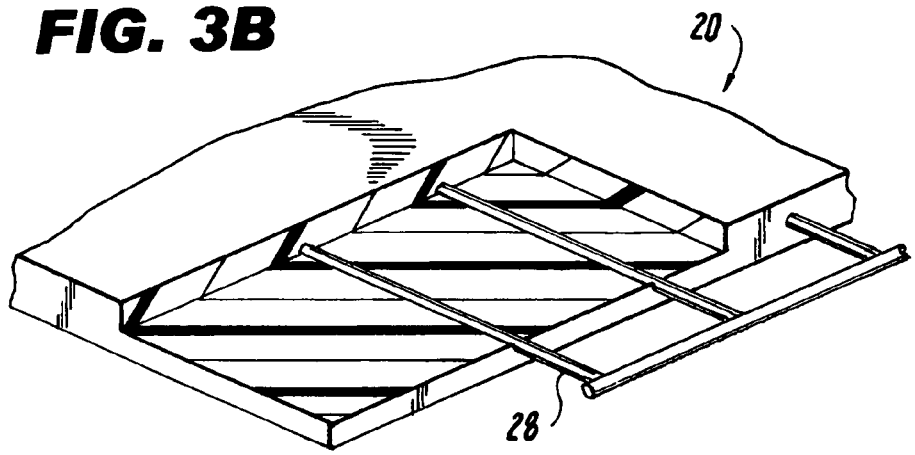

FIGS. 3A and 3B, show a first preferred embodiment of thermoform plastic material sheet 20 in accordance with the present invention which includes a plurality of spaced, generally parallel, straight embedded resistance wires 26. Wires 26 are connected in electrical parallel between the opposite poles of the voltage source in compartment 24.

Figure 4A:
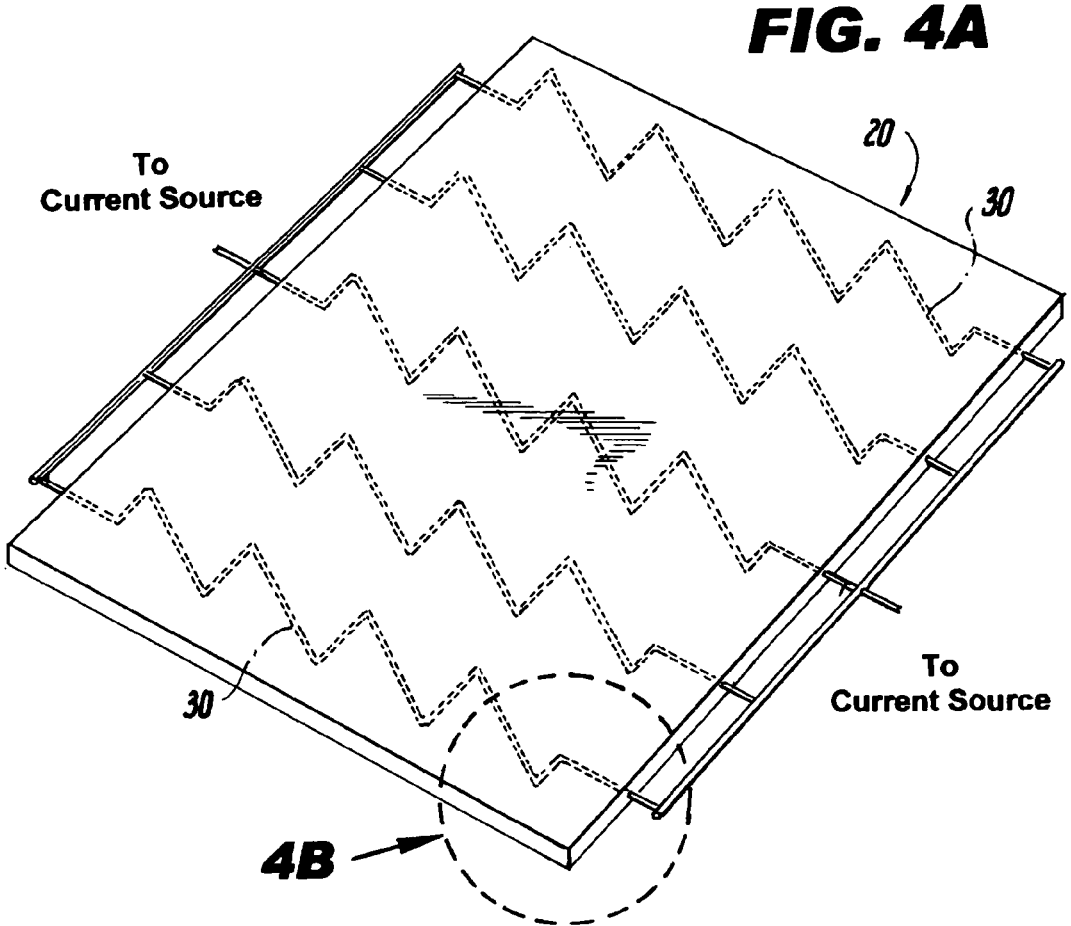
FIGS. 4A and 4B are respectively an isometric view and an enlarged, partially cut-away isometric view of a section of a second preferred embodiment of thermoform plastic material sheet having embedded heating wires arranged in a zigzag-like configuration, in accordance with the present invention.
Figure 4B:
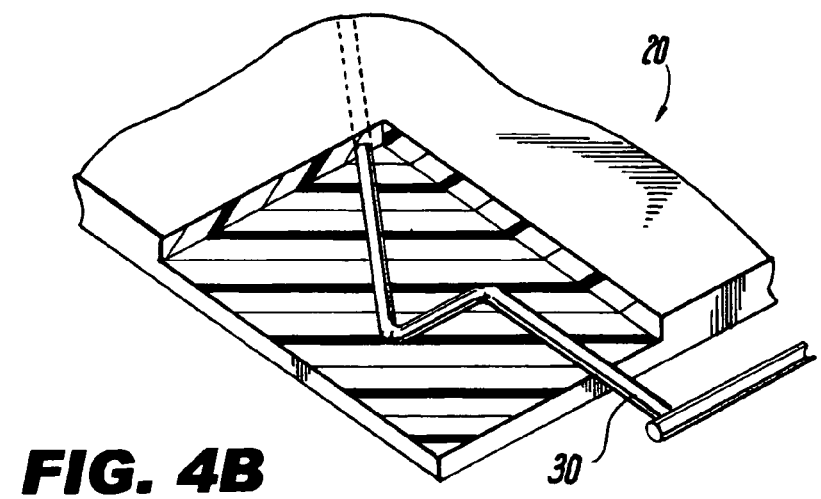

FIGS. 4A and 4B illustrate a second preferred embodiment of the invention, similar to that shown in FIGS. 3A and 3B, but in which the parallel resistance wires 30 are zigzagged or accordion-pleated. Wires 30 are formed in this fashion so that when the thermoform plastic sheet 20 is drawn over the mold, and the plastic material is stretched, the resistance wires 30 will straighten, and the effective length thereof will increase to accommodate the increased size of the plastic material.

Figure 5A:
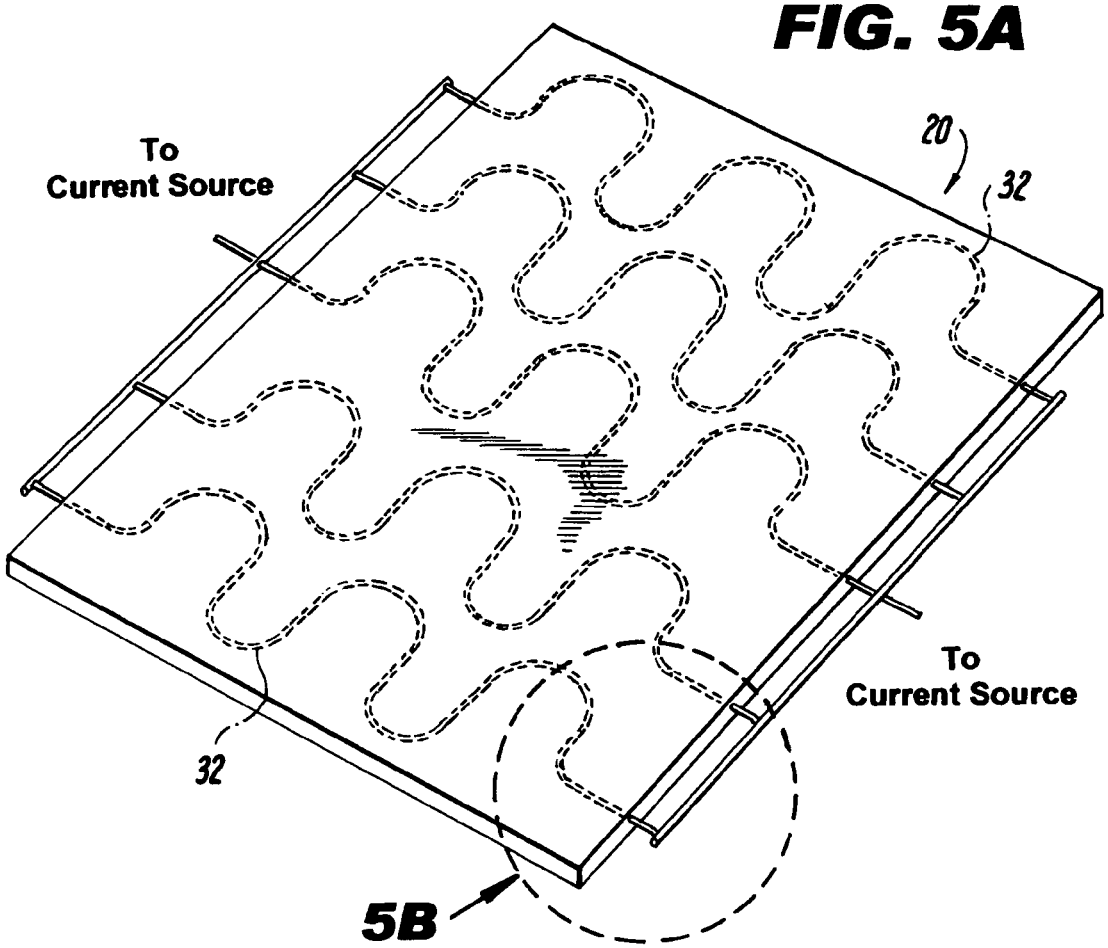
FIGS. 5A and 5B are respectively an isometric view and an enlarged, partially cut-away isometric view of a section of a third preferred embodiment of thermoform plastic material sheet having embedded heating wires arranged in a serpentine-like configuration, in accordance with the present invention.
Figure 5B:
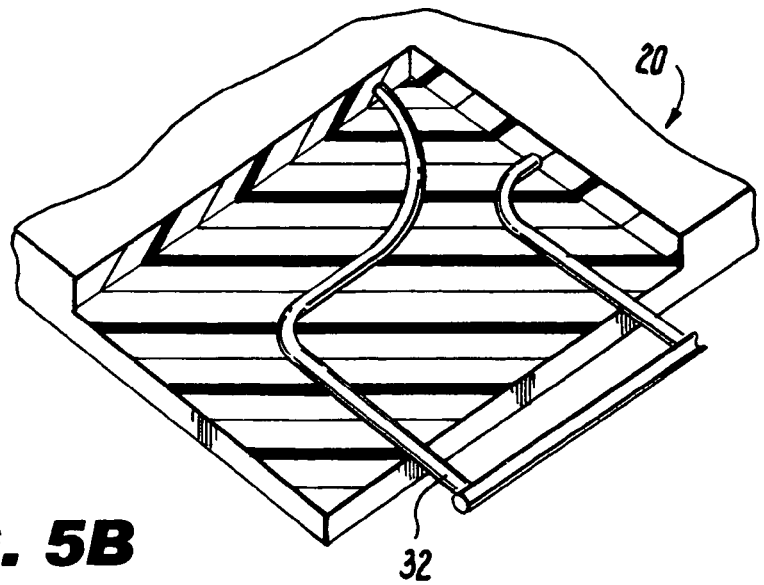

FIGS. 5A and 5B illustrate a third preferred embodiment of the invention, similar to that shown in FIGS. 3A and 3B, but in which the parallel resistance wires 32 have a serpentine configuration. Like wires 30, wires 32 are formed in this fashion so that when the thermoform plastic material sheet 20 is drawn over the mold, and the plastic material is stretched, the resistance wires 32 will straighten, and the effective length thereof will increase to accommodate the increased size of the plastic material.

Figure 6A:
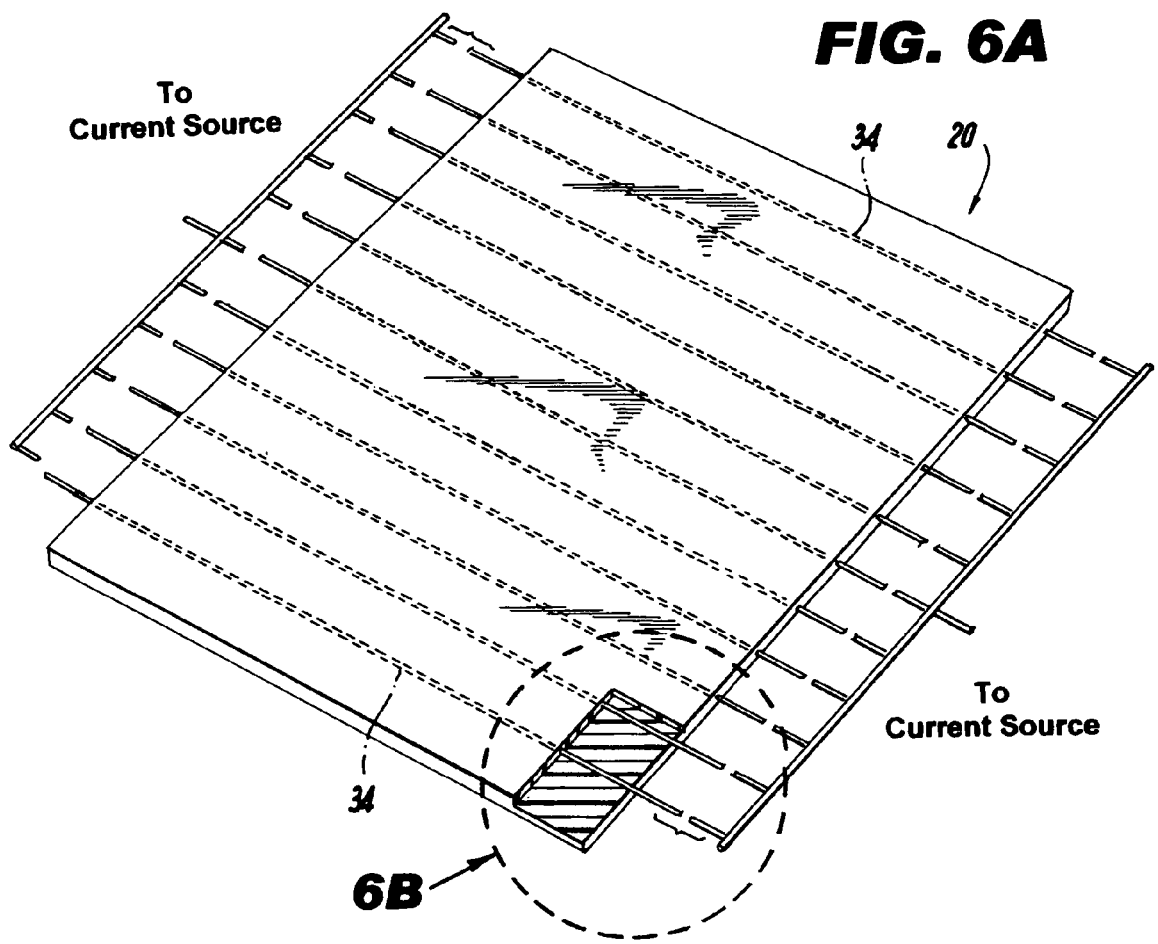
FIGS. 6A and 6B are respectively an isometric view and an enlarged, partially cut-away isometric view of a section of a fourth preferred embodiment of thermoform plastic material sheet with embedded heating wires that include sections extending substantially beyond the edges of the sheet, in accordance with the present invention.
Figure 6B:
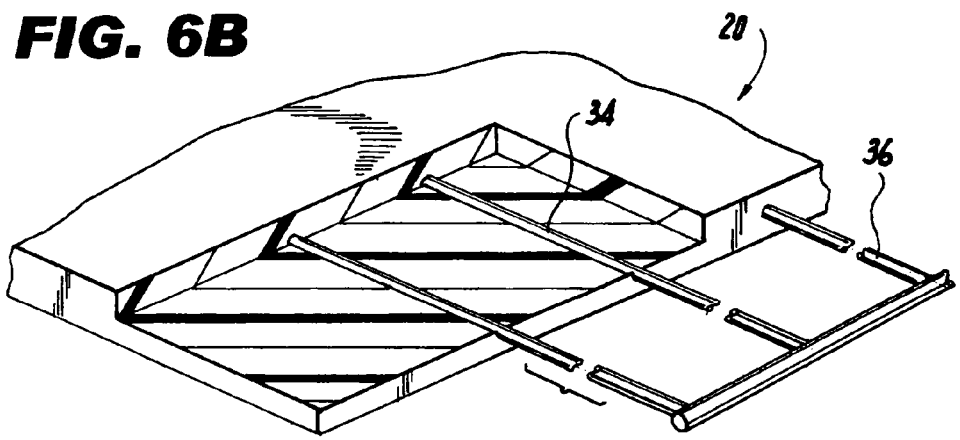
Figure 7A:
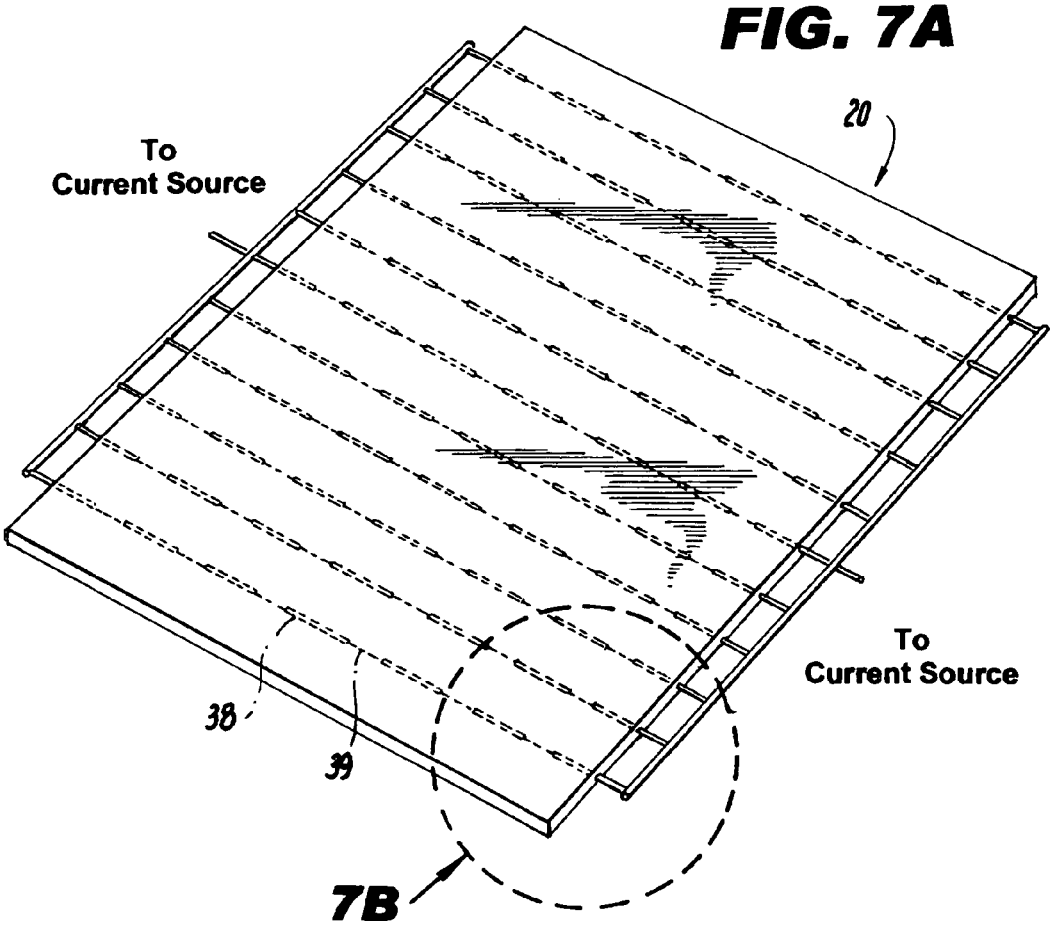
FIGS. 7A and 7B are respectively an isometric view and an enlarged, partially cut-away isometric view of a section of a fifth preferred embodiment of thermoform plastic material sheet with frangible internal heating wires, in accordance with the present invention.
Figure 7B:
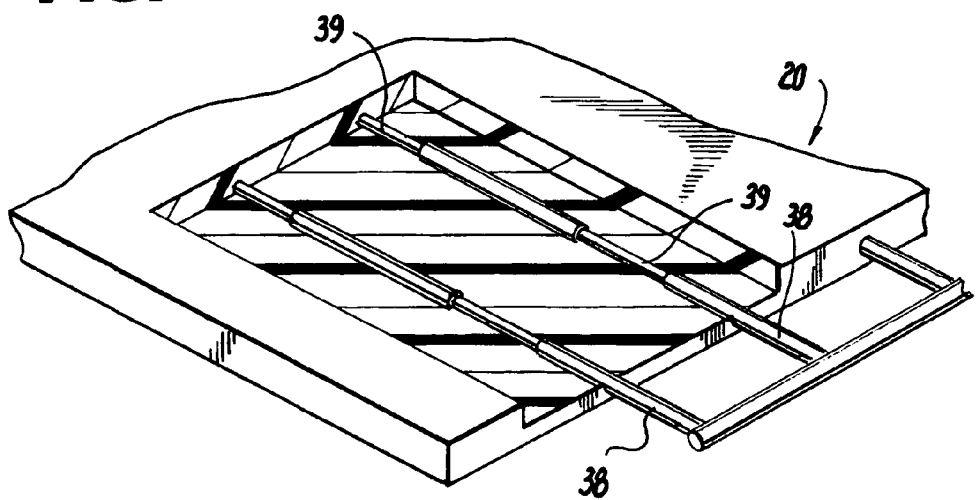

FIGS. 6A and 6B illustrate a fourth preferred embodiment of the present invention, similar to that shown in FIGS. 3A and 3B. However, in this embodiment, each of the wires 34 has an external section 36 that extends a substantial distance beyond the edge of sheet 20. The resistance wires 34 are formed in this manner such that the external portion 36 of the each of the wires 34 can be "pulled" into the thermoform plastic sheet 20 when the thermoform plastic sheet is drawn and stretched over the mold. The result will be a molded article with substantially parallel wires embedded therein, and a small portion of exposed wires protruding therefrom, which may be useful for connecting any outside electrical means, e.g. means for attaching to an RF antenna FIGS. 7A and 7B illustrate a fifth preferred embodiment of the invention, similar to that shown in FIGS. 3A and 3B, but in which the embedded resistance wires take the form of frangible/perforated resistance heating wires 38, The break points 39 of wires 38 are indicated by the wire sections having a smaller diameter than the other wire sections, as best seen in FIG. 8B. With wires of this configuration, as the sheet is drawn and stretched over the mold, the wires which are rigid and straight, will fracture or "snap" at various points along the length thereof. The wire sections formed in this manner will remain in the molded article. This may be done for any number of reasons, e.g. because it is desirable to have a finished article with an impedance or appearance different than that containing continuous wires.

Figure 8A:
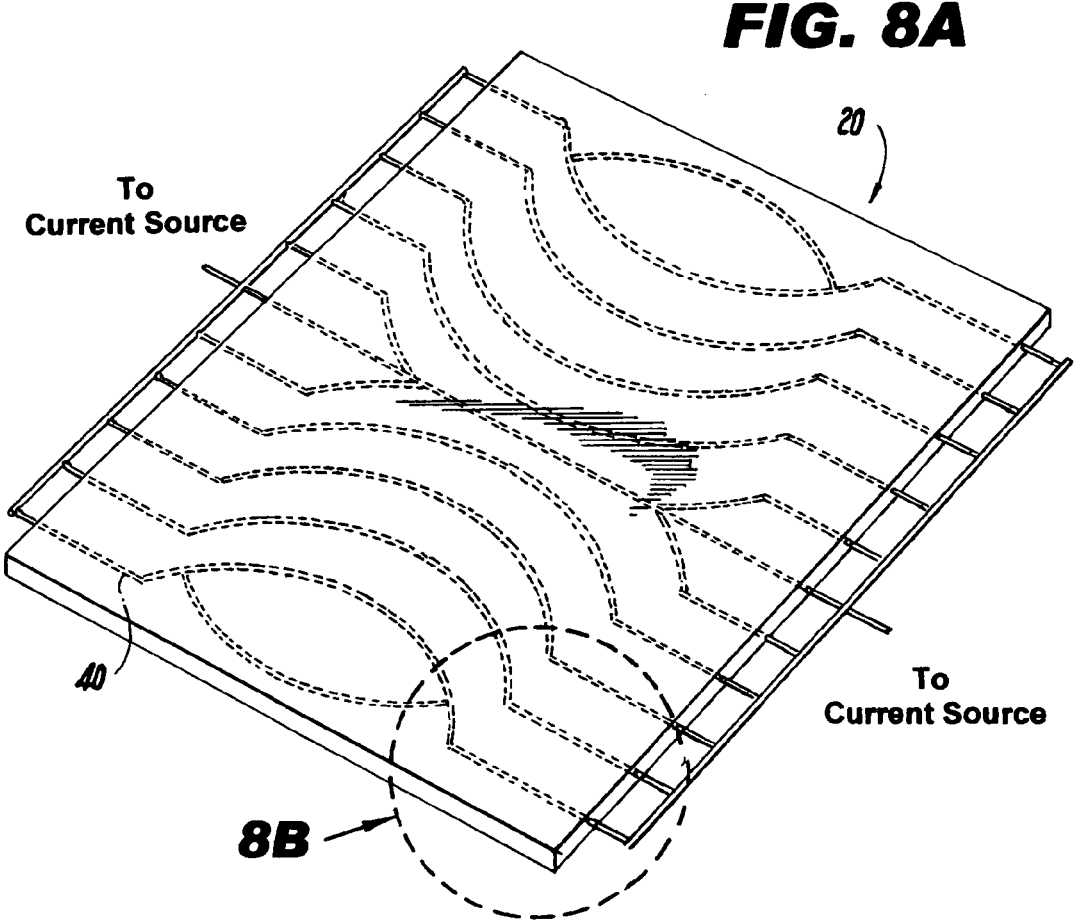
FIGS. 8A and 8B are respectively an isometric view and an enlarged, partially cut-away isometric view of a section of a sixth preferred embodiment of thermoform plastic material sheet with curved embedded heating wires, in accordance with the present invention.
Figure 8B:
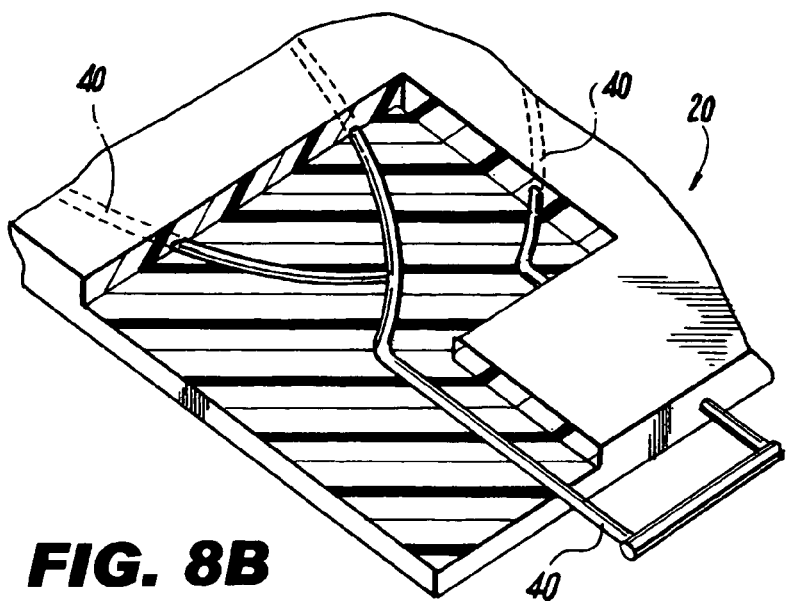

FIGS. 8A and 8B illustrate a sixth preferred embodiment of the invention, similar to that shown in FIGS. 3A and 3B, but in which the resistance wires 40 are arcuate. Wires 40 are formed in this fashion so that when the thermoform plastic sheet 20 is drawn over the mold, and the plastic material is stretched, the resistance wires 40 will straighten, and the effective length thereof will increase to accommodate the increased size of the plastic material.

Figure 9A:
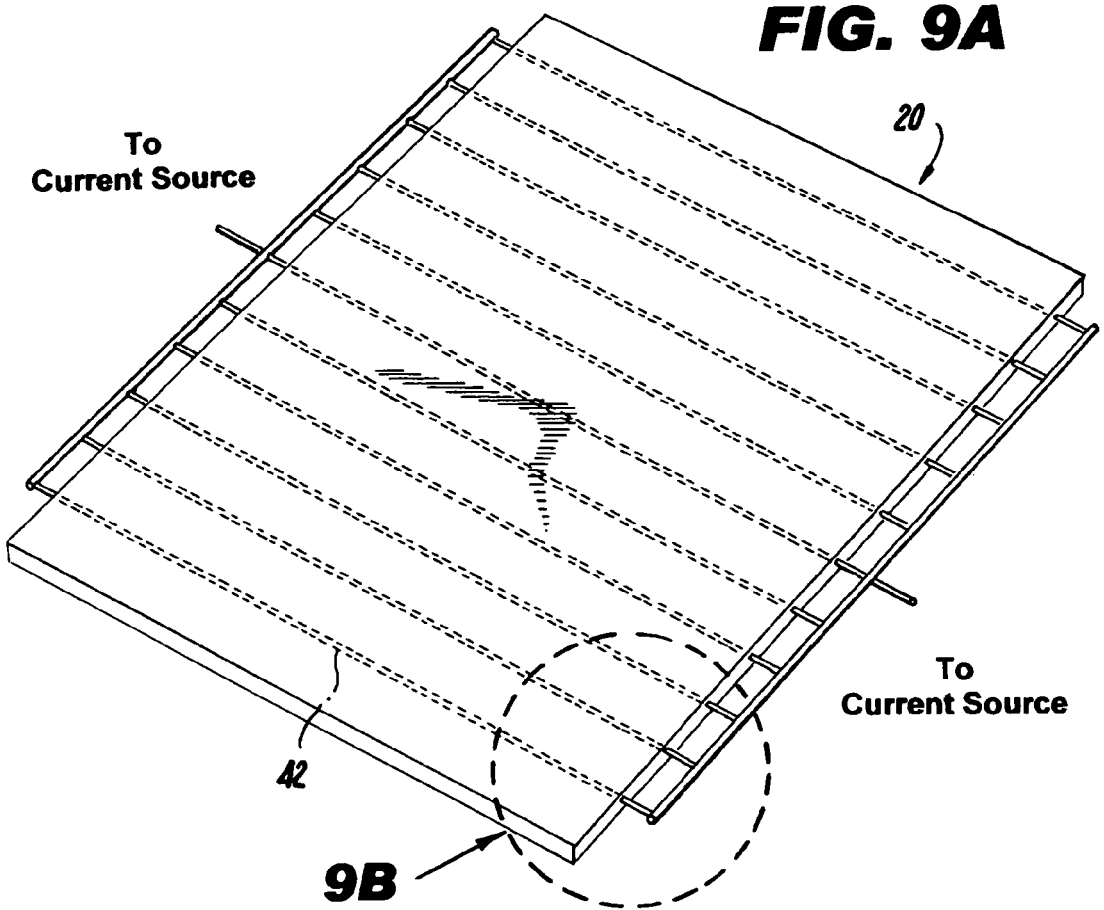
FIGS. 9A and 9B are respectively an isometric view and an enlarged, partially cut-away isometric view of a section of a seventh preferred embodiment of thermoform plastic material sheet with embedded heating wires located proximate the surface of the sheet, in accordance with the present invention.
Figure 9B:
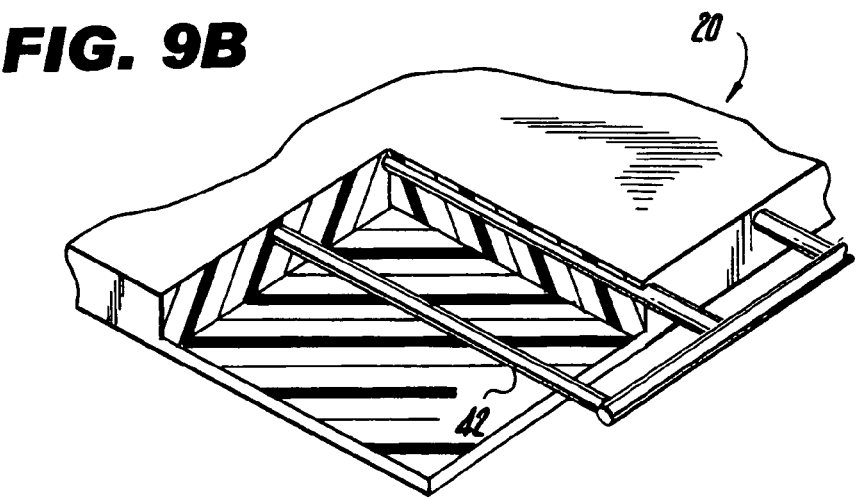

FIGS. 9A and 9B illustrate a seventh preferred embodiment of the invention, similar to that shown in FIGS. 3A and 3B, but in which the resistance wires 42 are located, not in the middle or otherwise deeply embedded in thermoform plastic sheet as in the previous embodiments, but instead are located proximate to a surface of thermoform plastic sheet. This is done so that the resistance heating wires 42 might be pulled free of thermoform plastic sheet when the thermoform plastic sheet is drawn and stretched over the mold (with resistance wires 42 typically, though not necessarily, being on the proximate the surface of the thermoform sheet facing away from the mold.

Figure 10A:
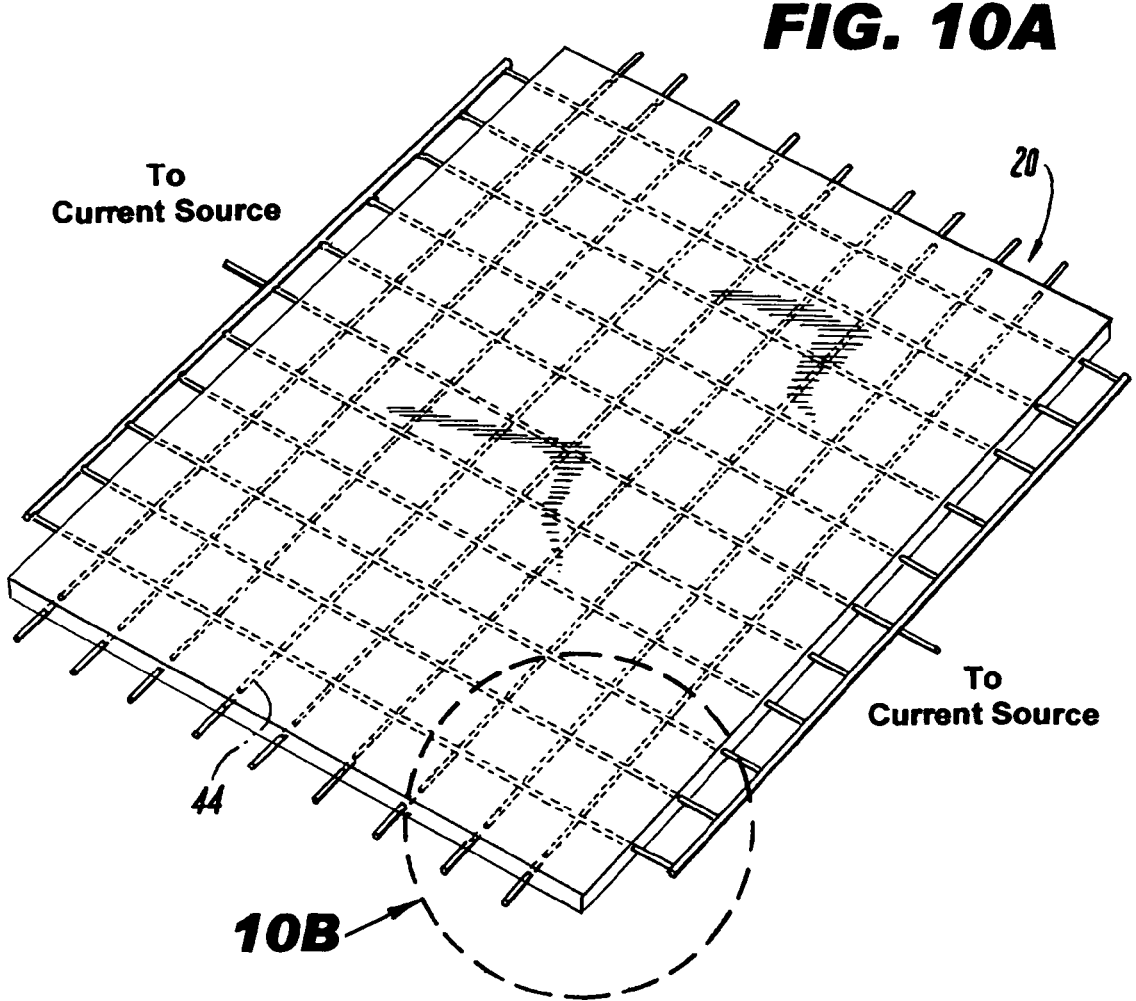
FIGS. 10A and 10B are respectively an isometric view and an enlarged, partially cut-away isometric view of a section of a eighth preferred embodiment of thermoform plastic material sheet with embedded heating wires arranged in a grid-like configuration, in accordance with the present invention.
Figure 10B:
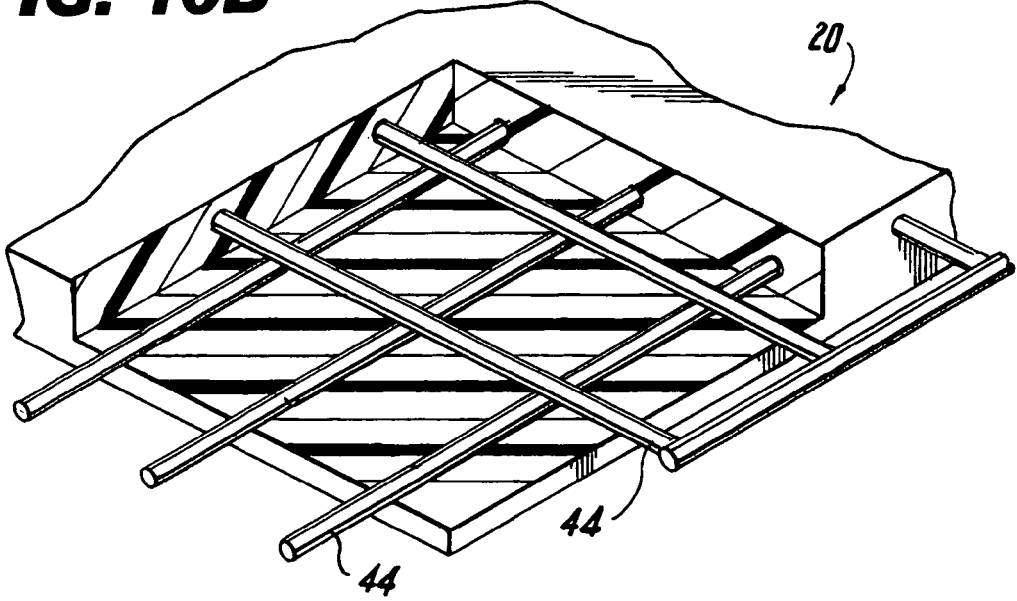

FIGS. 10A and 10B illustrate an eighth preferred embodiment of the invention, similar to that shown in FIGS. 3A and 3B, but in which orthogonally extending sets of resistance wires 44 form a grid-like pattern within the plastic material sheet 20. This provides a different heating/wire reinforcement pattern. It will also permit "addressable heating" using an x-y coordinate system whereby specific points and/or regions, and only those specific points and/or regions are heated, according to which resistance heating wire(s) 44 are selectively heated. In this embodiment, an electronic switch or other means for connecting the opposite ends of selectable ones of the wires 44 between the poles of one or more voltage sources is employed to achieve the desires heating pattern.

It will be understood by those skilled in the art that while the electrically conductive heating elements have been described as electrical wires herein for purposes of illustration, any form of electrically conductive element could be employed, such as metal foil, conductive plastic, etc. Furthermore, each thermoform plastic material sheet described herein could be two or more thermoform plastic material sheets in a laminate.

While only a limited number of preferred embodiments of the present invention have been disclosed for purposes of illustration, it is obvious that many modifications and variations could be made thereto. It is intended to cover all of those modifications and variations which fall within the scope of the present invention, as defined by the following claims.

The invention claimed is:

1. In combination, a plastic material sheet for use in vacuum thermoforming and a source of electric current, said sheet comprising: a sheet of thermally deformable polymer material suitable for thermoforming, and electrically conductive means, at least a portion of which is situated within said sheet and adapted to conduct an electrical current so as to heat said sheet sufficiently to soften said polymer material sheet to permit same to be deformed, and means for connecting said electric current source to said electrically conductive means.

2. The combination of claim 1 wherein said conductive means comprises a plurality of spaced, electrically conductive elements.

3. The combination of claim 2 wherein said elements are generally parallel to each other.

4. The combination of claim 2 wherein at least some of said elements are generally straight.

5. The combination of claim 2 wherein at least some of said elements have a generally zigzag configuration.

6. The combination of claim 2 wherein at least some of said elements have a generally serpentine configuration.

7. The combination of claim 2 wherein at least some of said elements comprise a section that extends substantially beyond the edge of the sheet.

8. The combination of claim 2 wherein at least some of said elements are frangible.

9. The combination of claim 2 wherein at least some of said elements have a generally arcuate configuration.

10. The combination of claim 2 wherein at least said elements comprise a section that is situated proximate a surface of the sheet.

11. The combination of claim 2 wherein said elements have a generally grid-like configuration.

12. A method of thermoforming a sheet of thermally deformable polymer material having at least one at least partially embedded electrically conductive element with first and second exposed ends in an apparatus having a mold with a surface associated with vacuum means and a voltage source, comprising the steps of: connecting the exposed ends of the conductive element to the opposite poles of the voltage source, causing current to flow through the conductive element so as to heat the sheet sufficiently to soften same, actuating the vacuum means to draw the softened sheet against the mold surface until the sheet assume the shape of the mold surface, terminating the current flow through the conductive element, allowing the molded sheet to cool and set in the shape of the mold surface and removing the sheet from the mold.

13. The method of claim 12 further comprising the step of removing the conductive element from the sheet before the sheet is completely cooled.

14. A thermoformed article comprising a thermally deformed sheet of polymer material having electrically conductive means adapted to conduct electrical current to heat said sheet sufficiently to soften the polymer sheet material to permit the sheet to be deformed at least partially embedded therein, said embedded portion of said electrically conductive means being in direct contact with said polymer material sheet.

15. The article of claim 14 wherein said conductive means comprises a plurality of spaced, electrically conductive elements.

16. The sheet of claim 15 wherein said elements are generally parallel to each other.

17. The sheet of claim 15 wherein at least some of said elements are generally straight.

18. The sheet of claim 15 wherein at least some of said elements comprise a section that extends substantially beyond the edge of the sheet.

19. The sheet of claim 15 wherein at least some of said elements are frangible.

20. The sheet of claim 15 wherein said elements have a generally grid-like configuration.

\* \* \* \* \*